United States Patent [19]

Beckford et al.

[11] 4,125,683

[45] Nov. 14, 1978

[54] ADJUSTABLE BATTERY STACKING SPACER

[75] Inventors: Murray D. Beckford, Cascade; Roy E. Hennen, Mequon; Van D. Wells, Wauwatosa, all of Wis.

[73] Assignee: Globe-Union Inc., Milwaukee, Wis.

[21] Appl. No.: 849,958

[22] Filed: Nov. 9, 1977

[51] Int. Cl.[2] ............................................... H01M 2/10
[52] U.S. Cl. .................................. 429/121; 206/821; 429/122
[58] Field of Search ................. 429/187, 65, 157, 121, 429/122; 339/224; 174/138 F, 138 G; 206/821

[56] References Cited

U.S. PATENT DOCUMENTS

| | | | |
|---|---|---|---|
| 1,718,086 | 6/1929 | Skinner | 429/65 |
| 2,022,595 | 11/1935 | Gowing | 429/65 |
| 2,507,811 | 5/1950 | Oechsner | 429/65 |
| 3,871,924 | 3/1975 | DeMattie et al. | 429/187 |

*Primary Examiner*—Donald L. Walton
*Attorney, Agent, or Firm*—John Phillip Ryan; David B. Smith

[57] ABSTRACT

A device for use in supporting lead-acid batteries in vertically spaced apart stacked relation and particularly for use with limited maintenance batteries of the type which include a pair of upwardly extending battery posts projecting through the battery cover and of the type not having vent caps or other devices extending above the surface of the top cover. The invention includes a spacer which is intended to be positioned between two vertically stacked batteries and to provide support for the upper battery. The battery stacking spacer is adjustable so that it can be used in connection with batteries having various sizes and different dimensions between the battery terminal posts.

10 Claims, 7 Drawing Figures

ADJUSTABLE BATTERY STACKING SPACER

BACKGROUND OF THE INVENTION

1. Field of the Ivention

The present invention relates to packaging articles and more particularly to an adjustable spacer for use in supporting automotive batteries in vertically stacked, spaced apart relation.

2. Description of the Prior Art

Since most automotive batteries include battery terminals projecting upwardly through the battery cover, vertical stacking of the batteries requires the use of a spacer between the batteries to provide support for the upper battery. In the past such spacers generally used were comprised of cardboard and had a thickness at least as great as the length of the battery posts exteding above the cover of the battery. Holes were generally provided in the cardboard to receive the upwardly projecting terminal posts.

Lead-acid automotive batteries are manufactured and sold in a variety of sizes. Accordingly, the size of prior art spacers required and the relative location of the terminal receiving holes demanded a unique spacer for each size of battery.

SUMMARY OF THE INVENTION

The present invention provides an improved battery stacking spacer particularly constructed such that it can be used in combination with a wide variety of battery sizes and such that it is inexpensive to manufacture.

The spacer of the invention generally comprises a pair of arcuate arms, hingedly joined together and each including an aperture in its free end to receive a battery terminal post therein. The arms each have a lower planar surface to be received against the cover of a first battery and an upper parallel planar surface for supporting a second battery thereon. The arms have a vertical thickness which is at least as great as the height of the battery post extending from the battery cover such that the battery terminal posts of the lower battery do not touch the battery stacked thereon.

To provide a hinged connection between the spacer arms, one of the arms has an end having a bore therein with a longitudinal axis parallel to the axis of the battery terminal post receiving aperture in the opposite end of that arm. The other arm includes a complementary pin receiveable in the bore in the first arm to form a hinged connection between the arcuate arms and thereby permitting the dimension between the apertures in the respective free ends of the arms to be varied.

DESCRIPTION OF THE PREFERRED EMBODIMENT

Figure 1:
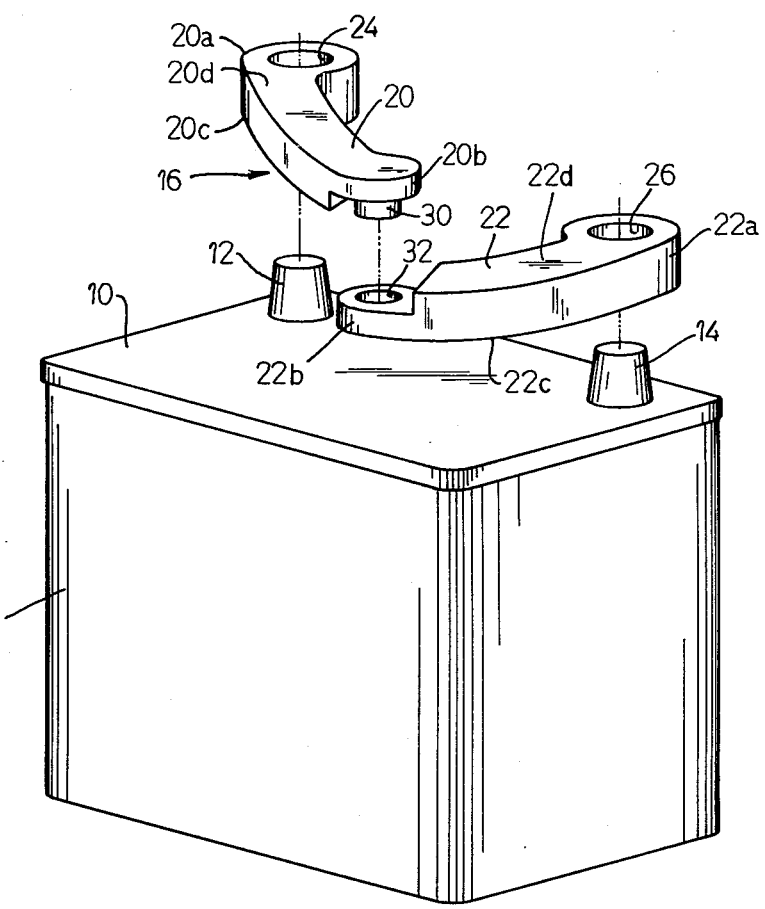
FIG. 1 is an exploded perspective view of an automotive battery and the battery stacking spacer of the invention.
Figure 2:
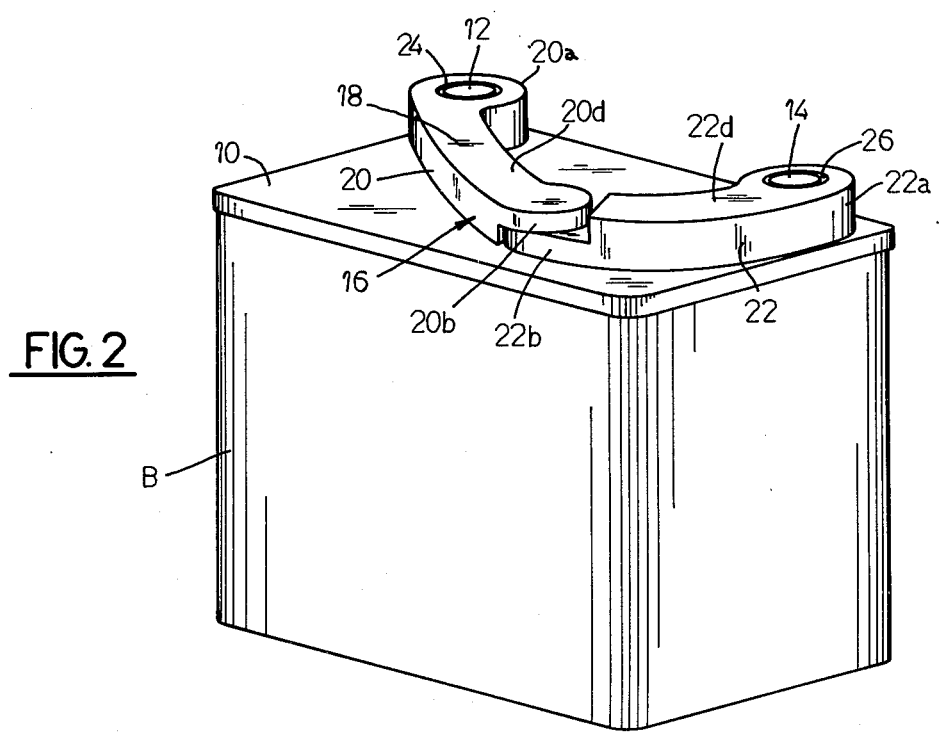
FIG. 2 is a view similar to FIG. 1 and showing the battery stacking spacer supported by the top surface of the battery.

Referring to FIGS. 1 and 2 of the drawings an automotive battery B is shown, the battery B including a generally planar top cover 10 and positive and negative battery posts 12 and 14, respectively, extending upwardly through the top cover 10. The adjustable battery stacking spacer 16 is positioned on the top cover 10 and includes a planar upper surface 18 for supporting a second battery (not shown). It will be noted that the stacking spacer 16 has a thickness greater than the height of the battery terminal posts 12 and 14 so that a second battery supported by the spacer does not rest upon the battery posts.

The adjustable battery stacking spacer 16 is comprised of a pair of generally arcuate arms 20 and 22 pivotably joined together to form an arcuate configuration. In the preferred form of the invention the arms 20 and 22 are formed from molded expanded plastic beads, molded foamed plastic such as styrofoam, or the like. The spacer should also be constructed from a material having a compression strength of at least 1.5 psi. The opposite ends of each of the arms define enlarged lobes 20a and 20b and 22a and 22b, respectively. Arms 20 and 22 also each have a lower planar surface 20c and 22c (FIG. 5), respectively, to be received against the planar top cover 10 of the battery B and planar upper surfaces 20d and 22d, respectively for supporting a battery thereon.

The lobes 20a and 22a of the arms 20 and 22 are provided with centrally located apertures 24 and 26, respectively, therethrough for receiving the battery posts 12 and 14. The apertures 24 and 26 are slightly larger in diameter than the battery posts 12 and 14 so that the arms 20 and 22 can be easily placed on the battery posts 12 and 14 of battery B.

The respective ends of the arms 20 and 22 opposite the apertures 24 and 26 are hingedly joined together and mutually pivotable about an axis parallel to the longitudinal axis of each of the apertures 24 and 26. To provide for a hinged connection between the arms 20 and 22, the lobe 20b of arm 20 supports an integral pivot pin 30 extending from the lobe, and intended to be received in a complementary aperture 32 through the lobe 22b of the arm 22. The pin 30 has a longitudinal axis parallel to the longitudinal axis of aperture 24 in the opposite end of arm 20 and the aperture 32 has a longitudinal axis parallel to the longitudinal axis of aperture 26 in arm 22. Accordingly, when the pin 30 is received within aperture 32 to provide a hinged connection between the arms 20 and 22, the arms are mutually pivotable about an axis parallel to the axes of the apertures 24 and 26 and pivotable movement of the arms causes movement of the apertures in a direction perpendicular to their respective axes. Consequently, the stacking spacer 16 can be used with a wide variety of battery sizes regardless of the sizes of the battery and the spacing between the battery posts.

Figure 3:
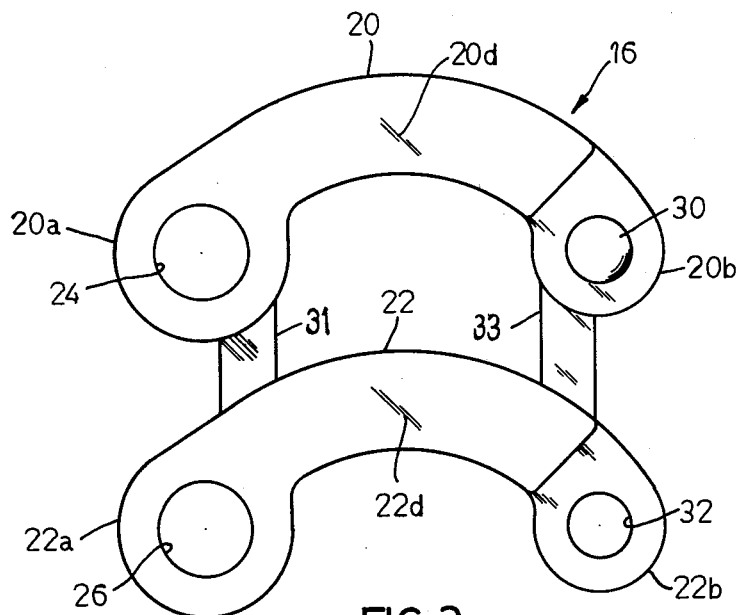
FIG. 3 is a plan view of the molded spacer components which comprise the battery stacking spacer shown in FIGS. 1 and 2, the molded components being joined together.
Figure 4:
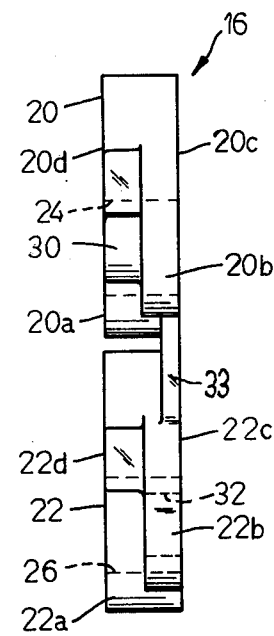
FIG. 4 is an elevation view of the joined molded spacer components shown in FIG. 3.
Figure 5:
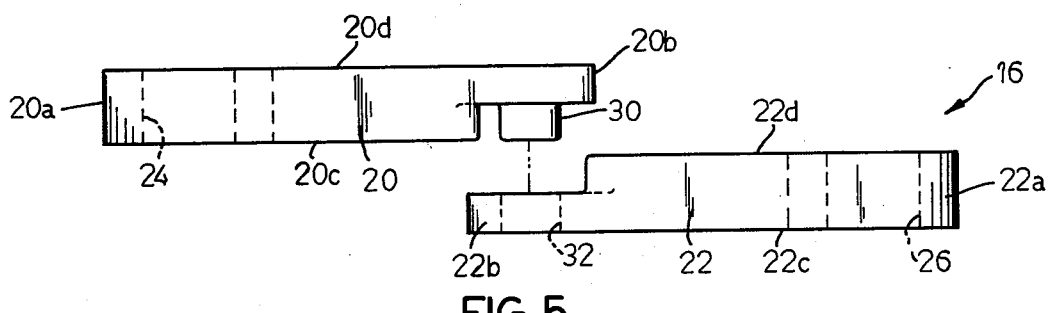
FIG. 5 is an exploded side elevation view of the battery stacking spacer shown in FIGS. 1 and 2.
Figure 6:
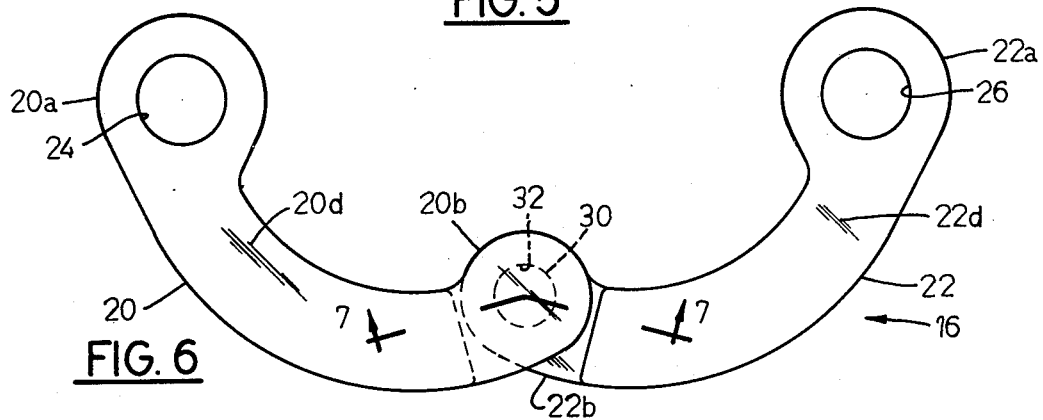
FIG. 6 is a plan view of the battery stacking spacer shown in FIG. 5.
Figure 7:
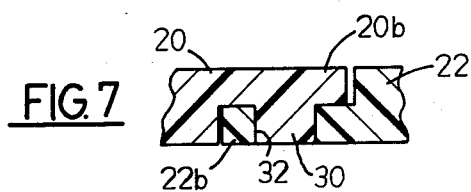
FIG. 7 is a cross section view taken along line 7—7 of FIG. 6.

A convenient means for molding the arms 20 and 22 is illustrated in FIGS. 3 and 5, the arcuate arms being disposed in generally stacked relationship with their lower surfaces 20c and 22c coplanar, and the arms being joined by molded runners 31 and 33 integrally connecting the opposite ends of the arms. The arms 20 and 22 can then be conveniently assembled to form the stacking spacer 16 by breaking or cutting away the runners 31 and 33.

I claim:

1. An adjustable battery supporting spacer for use in connection with batteries of the type having a pair of battery terminal posts extending upwardly through the battery cover with such batteries in vertically stacked relation, the spacer comprising a pair of arms each having opposite ends and each having a lower surface at least a portion of which is to be received against the cover of a first battery and each having an upper surface for supporting a second battery, said pair of arms each having a first end, the first ends being pivotably joined together, each of said arms having a second end including an aperture therein for receiving a battery terminal post therein, the aperture of said arms generally having parallel longitudinal axes and extending from said lower surface toward said upper surface, and means for pivotably joining together the first ends of the arms.

2. The adjustable battery supporting spacer set forth in claim 1 wherein said arms have a thickness between the lower surface and the upper surface at least sufficient in height to spatially separate and support said stacked batteries out of direct contact with each other.

3. The adjustable battery supporting spacer set forth in claim 1 wherein each of said arms are arcuate.

4. The adjustable spacer set forth in claim 1 wherein said spacer has a generally arcuate configuration.

5. The adjustable battery supporting spacer set forth in claim 1 wherein said arms are comprised of a material having a compression strength of at least 1.5 psi.

6. The adjustable battery supporting spacer set forth in claim 1 wherein the means for pivotably joining together the other ends of the arms includes a projecting pin extending from the first end of one of the arms, said pin having a longitudinal axis generally parallel to the aperture in the second end of said one of the arms and the other of said arms having an aperture in its first end for receiving said pin and having a longitudinal axis parallel to the aperture in the second end of said other of said arms.

7. The adjustable battery supporting spacer set forth in claim 6 wherein each of said arms are arcuate.

8. The adjustable battery supporting spacer set forth in claim 7 wherein said arms are molded foamed plastic.

9. An adjustable device for providing spatial separation between adjacently positioned batteries comprising:

a pair of arm members each arm having a bottom portion to be supported against a portion of a first battery and a top portion for engaging a portion of an adjacently positioned second battery, said arm members each having first and second ends; means engaging the first ends of said arm members for providing a moveable interconnection between said pair of arm members; and, means on said second ends of said arm members for moveably engaging a terminal portion of one of said batteries.

10. The device of claim 9 wherein said arm members bottom and top portions are separated sufficiently to provide spatial separation preventing direct contact between any adjacent portions of said batteries.

* * * * *